US012587271B2

(12) United States Patent
Geng et al.

(10) Patent No.: US 12,587,271 B2
(45) Date of Patent: Mar. 24, 2026

(54) COMMUNICATION METHOD, APPARATUS, AND SYSTEM

(71) Applicant: HUAWEI TECHNOLOGIES CO., LTD., Shenzhen (CN)

(72) Inventors: Tingting Geng, Shanghai (CN); Yedan Wu, Shanghai (CN); Le Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/897,433

(22) Filed: Aug. 29, 2022

(65) Prior Publication Data

US 2022/0416883 A1     Dec. 29, 2022

Related U.S. Application Data

(63) Continuation of application No. PCT/CN2021/070363, filed on Jan. 5, 2021.

(30) Foreign Application Priority Data

Feb. 27, 2020    (CN) .......................... 202010125656.1

(51) Int. Cl.
H04B 7/185 (2006.01)
(52) U.S. Cl.
CPC ..... H04B 7/18519 (2013.01); H04B 7/18513 (2013.01)
(58) Field of Classification Search
CPC ........................ H04B 7/18519; H04B 7/18513
See application file for complete search history.

(56) References Cited

U.S. PATENT DOCUMENTS

| | | | |
|---|---|---|---|
| 2013/0035111 A1 | 2/2013 | Moeglein et al. | |
| 2019/0222303 A1 | 7/2019 | Lucky et al. | |
| 2021/0243802 A1* | 8/2021 | Decarreau ............. | H04W 74/02 |
| 2021/0266810 A1* | 8/2021 | Koskela ................ | H04W 36/06 |

(Continued)

FOREIGN PATENT DOCUMENTS

| | | |
|---|---|---|
| CN | 106133553 A | 11/2016 |
| CN | 109121147 A | 1/2019 |
| CN | 109479278 A | 3/2019 |

(Continued)

OTHER PUBLICATIONS

Ericsson, "Report of email discussion [107bis##67] [NR-NTN]", 3GPP TSG-RAN WG2 Meeting #108 Tdoc R2-1916391, Nov. 23, 2019, total 15 pages.

(Continued)

*Primary Examiner* — Michael Thier
*Assistant Examiner* — Tracy Lauren Raimondo
(74) *Attorney, Agent, or Firm* — HAUPTMAN HAM, LLP

(57) ABSTRACT

A communication method includes determining based on area configuration information of a first cell of a network device and location information of a terminal device, a first sub-area corresponding to the terminal device. The area configuration information indicates information about a plurality of sub-areas corresponding to the first cell. The plurality of sub-areas includes the first sub-area. The method also includes obtaining satellite ephemeris information corresponding to the first sub-area.

20 Claims, 5 Drawing Sheets

(56) References Cited

U.S. PATENT DOCUMENTS

| | | | | | |
|---|---|---|---|---|---|
| 2022/0232447 A1* | 7/2022 | Lu | ....................... | H04W 36/302 |
| 2022/0240219 A1* | 7/2022 | Tian | .................... | H04B 7/1851 |

FOREIGN PATENT DOCUMENTS

| | | | |
|---|---|---|---|
| CN | 109660293 | A | 4/2019 |
| EP | 3905546 | A1 | 11/2021 |
| WO | 9956145 | A1 | 11/1999 |
| WO | 2019201808 | A1 | 10/2019 |

OTHER PUBLICATIONS

International Search Report issued in corresponding International Application No. PCT/CN2021/070363, dated Mar. 22, 2021, pp. 1-13.
Qualcomm Incorporated et al: "Satellite Cell Solution for Mobility and Regulatory Support for Satellite Access in 5G", SA WG2 Meeting #136, S2-1912524, Nov. 18-22, 2019, Reno, Nevada, USA, total 13 pages.
Chinese Office Action issued in corresponding Chinese Application No. 202010125656.1, dated Oct. 31, 2024, pp. 1-23.

* cited by examiner

Sub-area 1         Sub-area 2

First cell

Sub-area 3         Sub-area 4

Sub-area 1         Sub-area 2

First cell

Sub-area 3         Sub-area 4

COMMUNICATION METHOD, APPARATUS, AND SYSTEM

CROSS-REFERENCE TO RELATED APPLICATIONS

This application is a continuation of International Application No. PCT/CN2021/070363, filed on Jan. 5, 2021, which claims priority to Chinese Patent Application No. 202010125656.1, filed on Feb. 27, 2020. The disclosures of the aforementioned applications are hereby incorporated by reference in their entireties.

TECHNICAL FIELD

Embodiments of this application relate to the field of communication technologies, and in particular, to a communication method, apparatus, and system.

BACKGROUND

Because a conventional terrestrial network (TN) cannot provide seamless coverage for a terminal device, especially in a place in which a network device cannot be deployed, such as a sea, a desert, or the air, a non-terrestrial network (NTN) system is introduced into the 5th generation (5G) system. The NTN system may include a satellite communication system, a high-altitude platform station (HAPS) communication system, or another non-terrestrial communication system. In the NTN system, network device functions or some network device functions are deployed on a satellite, a mobile uncrewed aerial vehicle, a mobile hot air balloon, or the like, to provide seamless coverage for the terminal device. In addition, a natural disaster has little impact on the NTN system, so that reliability of the 5G system can be improved.

When a network device in the NTN system keeps running, a ground terminal device needs to re-obtain corresponding satellite ephemeris information, to perform an application scenario such as cell measurement.

In a conventional technology, the terminal device usually obtains satellite ephemeris information corresponding to a serving cell in which the terminal device is located. However, because a cell in the NTN system is a satellite cell with a large coverage area, there is a large amount of satellite ephemeris information corresponding to the satellite cell. Consequently, overheads are high when the terminal device obtains the satellite ephemeris information corresponding to the serving cell.

SUMMARY

Embodiments of this application provide a communication method, apparatus, and system, to reduce overheads of a terminal device.

According to a first aspect, an embodiment of this application provides a communication method, including: determining, based on area configuration information of a first cell of a network device and location information of a terminal device, a first sub-area corresponding to the terminal device, where the area configuration information indicates information about a plurality of sub-areas corresponding to the first cell, and the plurality of sub-areas include the first sub-area; and obtaining satellite ephemeris information corresponding to the first sub-area.

In the foregoing solution, the sub-area is introduced, and the terminal device only needs to obtain satellite ephemeris information corresponding to the sub-area in which the terminal device is located. This reduces an amount of the satellite ephemeris information obtained by the terminal device, and therefore can reduce overheads of the terminal device.

In some possible implementations, the obtaining satellite ephemeris information corresponding to the first sub-area includes: sending first indication information to the network device, to request to obtain the satellite ephemeris information corresponding to the first sub-area; and receiving the satellite ephemeris information corresponding to the first sub-area from the network device.

Based on this implementation, the network device may send, to the terminal device based on a request of the terminal device, the satellite ephemeris information corresponding to the first sub-area, and may not need to send satellite ephemeris information corresponding to a serving cell of the terminal device and all satellite cells surrounding the serving cell. This can reduce overheads of air interface signaling.

In some possible implementations, the first indication information includes one or more of an identifier of the first sub-area, a central location coordinate of the first sub-area, or a user readable name of the first sub-area: or the first indication information includes bitmap information, where the bitmap information indicates the first sub-area.

In some possible implementations, the first indication information includes a first preamble, where the first preamble corresponds to the first sub-area.

In some possible implementations, the sending first indication information to the network device includes: sending the first preamble to the network device on a first access resource, where the first preamble and the first access resource correspond to the first sub-area.

The foregoing provides a plurality of different implementations of the first indication information, including the identifier of the first sub-area, the central location coordinate of the first sub-area, the user readable name of the first sub-area, the bitmap information, the preamble, or the preamble and an access resource. In actual application, one of the implementations may be selected based on an actual situation to represent the first indication information, and implementation is flexible.

In some possible implementations, the obtaining satellite ephemeris information corresponding to the first sub-area includes: receiving, from the network device, satellite ephemeris information respectively corresponding to at least two sub-areas of the first cell, where the at least two sub-areas include the first sub-area; and obtaining, from the satellite ephemeris information respectively corresponding to the at least two sub-areas of the first cell, the satellite ephemeris information corresponding to the first sub-area.

Based on this implementation, the network device may actively send, to the terminal device, the satellite ephemeris information respectively corresponding to the sub-areas of the first cell, so that the terminal device is prevented from requesting satellite ephemeris information corresponding to a sub-area, and power consumption of the terminal device is reduced.

In some possible implementations, before the receiving, from the network device, satellite ephemeris information respectively corresponding to at least two sub-areas of the first cell, the method further includes: sending second indication information to the network device, to request to obtain the satellite ephemeris information respectively corresponding to the at least two sub-areas of the first cell.

In some possible implementations, the second indication information includes a second preamble, where the second preamble corresponds to a first system message; and the receiving, from the network device, satellite ephemeris information respectively corresponding to at least two sub-areas of the first cell includes: receiving, from the network device, the first system message corresponding to the second preamble, where the first system message includes the satellite ephemeris information respectively corresponding to the at least two sub-areas of the first cell.

In some possible implementations, the sending second indication information to the network device includes: sending the second preamble to the network device on a second access resource; and the receiving, from the network device, the first system message corresponding to the second preamble includes: receiving, from the network device, the first system message corresponding to the second preamble and the second access resource.

The foregoing provides a plurality of different implementations of the second indication information, including the preamble, or the preamble and the access resource. In actual application, one of the implementations may be selected based on an actual situation to represent the second indication information, and implementation is flexible.

In some possible implementations, the method further includes: receiving third indication information from the network device, where the third indication information indicates information about a sub-area corresponding to satellite ephemeris information sent by the network device.

Based on this implementation, the network device notifies, by using the indication information, the terminal device of the information about the sub-area corresponding to the satellite ephemeris information sent to the terminal device, so that the terminal device can accurately obtain the satellite ephemeris information.

In some possible implementations, the method further includes: receiving the area configuration information corresponding to the first cell from the network device.

According to a second aspect, an embodiment of this application provides a communication method, including: determining a plurality of sub-areas corresponding to a first cell of a network device; and sending area configuration information to a terminal device, where the area configuration information indicates information about the plurality of sub-areas corresponding to the first cell, the plurality of sub-areas include a first sub-area, the area configuration information is used by the terminal device to obtain satellite ephemeris information corresponding to the first sub-area, and the first sub-area is a sub-area in which the terminal device is located.

In the foregoing solution, the sub-area is introduced, and the terminal device only needs to obtain the satellite ephemeris information corresponding to the sub-area in which the terminal device is located. This reduces an amount of satellite ephemeris information obtained by the terminal device, and therefore can reduce overheads of the terminal device.

In some possible implementations, the method further includes: receiving first indication information from the terminal device, where the first indication information requests to obtain the satellite ephemeris information corresponding to the first sub-area; and sending the satellite ephemeris information corresponding to the first sub-area to the terminal device.

Based on this implementation, the network device may send, to the terminal device based on a request of the terminal device, the satellite ephemeris information corresponding to the first sub-area, and may not need to send satellite ephemeris information corresponding to a serving cell of the terminal device and all satellite cells surrounding the serving cell. This can reduce overheads of air interface signaling.

In some possible implementations, the first indication information includes one or more of an identifier of the first sub-area, a central location coordinate of the first sub-area, or a user readable name of the first sub-area: or the first indication information includes bitmap information, where the bitmap information indicates the first sub-area.

In some possible implementations, the first indication information includes a first preamble, where the first preamble corresponds to the first sub-area.

In some possible implementations, the receiving first indication information from the terminal device includes: receiving the first preamble from the terminal device on a first access resource, where the first preamble and the first access resource correspond to the first sub-area.

The foregoing provides a plurality of different implementations of the first indication information, including the identifier of the first sub-area, the central location coordinate of the first sub-area, the user readable name of the first sub-area, the bitmap information, the preamble, or the preamble and the access resource. In actual application, one of the implementations may be selected based on an actual situation to represent the first indication information, and implementation is flexible.

In some possible implementations, the method further includes: sending, to the terminal device, satellite ephemeris information respectively corresponding to at least two sub-areas of the first cell, where the at least two sub-areas include the first sub-area.

Based on this implementation, the network device may actively send, to the terminal device, the satellite ephemeris information respectively corresponding to the sub-areas of the first cell, so that the terminal device is prevented from requesting satellite ephemeris information corresponding to a sub-area, and power consumption of the terminal device is reduced.

In some possible implementations, before the sending, to the terminal device, satellite ephemeris information respectively corresponding to at least two sub-areas of the first cell, the method further includes: receiving second indication information from the terminal device, where the second indication information requests to obtain the satellite ephemeris information respectively corresponding to the at least two sub-areas of the first cell.

In some possible implementations, the second indication information includes a second preamble, where the second preamble corresponds to a first system message; and the sending, to the terminal device, satellite ephemeris information respectively corresponding to at least two sub-areas of the first cell includes: sending, to the terminal device, the first system message corresponding to the second preamble, where the first system message includes the satellite ephemeris information respectively corresponding to the at least two sub-areas of the first cell.

In some possible implementations, the receiving second indication information from the terminal device includes: receiving the second preamble from the terminal device on a second access resource; and the sending, to the terminal device, the first system message corresponding to the second preamble includes: sending, to the terminal device, the first system message corresponding to the second preamble and the second access resource.

The foregoing provides a plurality of different implementations of the second indication information, including the preamble, or the preamble and the access resource. In actual application, one of the implementations may be selected based on an actual situation to represent the second indication information, and implementation is flexible.

In some possible implementations, the method further includes: sending third indication information to the terminal device, where the third indication information indicates information about a sub-area corresponding to sent satellite ephemeris information.

Based on this implementation, the network device notifies, by using the indication information, the terminal device of the information about the sub-area corresponding to the satellite ephemeris information sent to the terminal device, so that the terminal device can accurately obtain the satellite ephemeris information.

According to any one of the first aspect or the implementations of the first aspect, or any one of the second aspect or the implementations of the second aspect, in some possible implementations, the satellite ephemeris information corresponding to the first sub-area includes one or more of the following: satellite ephemeris information of a satellite in the first sub-area at a current moment, first time information, satellite ephemeris information of a satellite that is to run to the first sub-area at first time, satellite ephemeris information of a satellite that is in a neighboring area of the first sub-area at the current moment, second time information, and satellite ephemeris information of a satellite that is to run to the neighboring area of the first sub-area at second time.

In some possible implementations, a geographical area range including the plurality of sub-areas corresponding to the first cell is the same as a coverage area of the first cell: or a geographical area range including the plurality of sub-areas corresponding to the first cell is greater than a coverage area of the first cell.

According to a third aspect, an embodiment of this application provides a communication apparatus. The apparatus may be a terminal device, or may be a chip used in the terminal device. The apparatus has functions of implementing the first aspect or the embodiments of the first aspect. The function may be implemented by hardware, or may be implemented by hardware executing corresponding software. The hardware or the software includes one or more modules corresponding to the function.

According to a fourth aspect, an embodiment of this application provides a communication apparatus. The apparatus may be a network device, or may be a chip used in the network device. The apparatus has functions of implementing the second aspect or the embodiments of the second aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus includes a processor and a memory. The memory is configured to store computer-executable instructions. When the apparatus runs, the processor executes the computer-executable instructions stored in the memory, to enable the apparatus to perform the method in the first aspect, the second aspect, the embodiments of the first aspect, or the embodiments of the second aspect.

According to a sixth aspect, an embodiment of this application provides a communication apparatus, including units or means configured to perform the steps in the first aspect, the second aspect, the embodiments of the first aspect, or the embodiments of the second aspect.

According to a seventh aspect, an embodiment of this application provides a communication apparatus, including a processor and an interface circuit. The processor is configured to: communicate with another apparatus through the interface circuit, and perform the method in the first aspect, the second aspect, the embodiments of the first aspect, or the embodiments of the second aspect. There are one or more processors.

According to an eighth aspect, an embodiment of this application provides a communication apparatus, including a processor, coupled to a memory, and configured to invoke a program stored in the memory, to perform the method in the first aspect, the second aspect, the embodiments of the first aspect, or the embodiments of the second aspect. The memory may be located inside or outside the apparatus. There are one or more processors.

According to a ninth aspect, an embodiment of this application further provides a computer-readable storage medium. The computer-readable storage medium stores instructions. When the instructions are run on a computer, a processor is enabled to perform the method in the first aspect, the second aspect, the embodiments of the first aspect, or the embodiments of the second aspect.

According to a tenth aspect, an embodiment of this application further provides a computer program product. The computer program product includes a computer program. When the computer program is run, the method in the first aspect, the second aspect, the embodiments of the first aspect, or the embodiments of the second aspect is performed.

According to an eleventh aspect, an embodiment of this application further provides a chip system, including a processor, configured to perform the method in the first aspect, the second aspect, the embodiments of the first aspect, or the embodiments of the second aspect.

According to a twelfth aspect, an embodiment of this application further provides a communication system. The communication system includes a terminal device and a network device. The network device is configured to: determine a plurality of sub-areas corresponding to a first cell of the network device; and send area configuration information to the terminal device, where the area configuration information indicates information about the plurality of sub-areas corresponding to the first cell, and the plurality of sub-areas include a first sub-area. The terminal device is configured to: determine, based on the area configuration information and location information of the terminal device, the first sub-area corresponding to the terminal device; and obtain satellite ephemeris information corresponding to the first sub-area.

According to a thirteenth aspect, an embodiment of this application further provides a communication method, including: A network device determines a plurality of sub-areas corresponding to a first cell of the network device: the network device sends area configuration information to a terminal device, where the area configuration information indicates information about the plurality of sub-areas corresponding to the first cell, and the plurality of sub-areas include a first sub-area: the terminal device determines, based on the area configuration information and location information of the terminal device, the first sub-area corresponding to the terminal device; and the terminal device obtains satellite ephemeris information corresponding to the first sub-area.

DESCRIPTION OF EMBODIMENTS

To make the objectives, technical solutions and advantages of embodiments of this application clearer, the following further describes embodiments of this application in detail with reference to the accompanying drawings. Any operation method discussed in a method embodiment may also be applied to an apparatus embodiment or a system embodiment. In descriptions of embodiments of this application, "a plurality of" means two or more than two unless otherwise specified.

Figure 1:
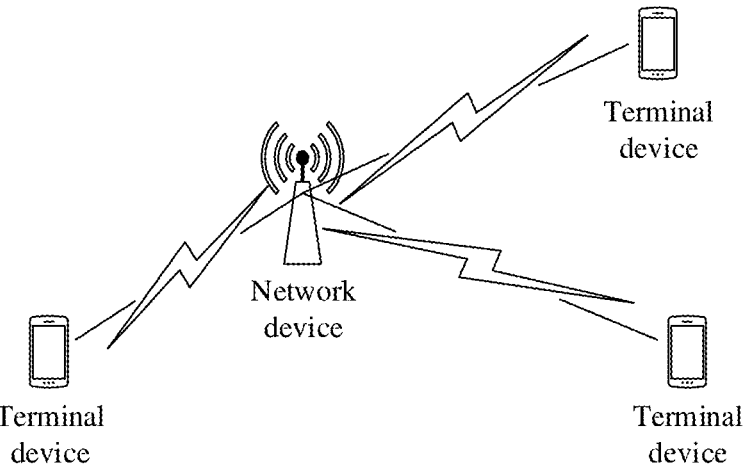
FIG. 1 is a schematic diagram of a possible network architecture according to an embodiment of this application.

FIG. 1 is a schematic diagram of a network architecture to which an embodiment of this application is applicable. The network architecture includes a terminal device and a network device. The terminal device communicates with the network device through a wireless interface.

The terminal device is a device having a wireless transceiver function. The terminal device may be deployed on land, and includes an indoor device, an outdoor device, a handheld device, or a vehicle-mounted device: or may be deployed on a water surface (for example, on a ship): or may be deployed in the air (for example, on an airplane, a balloon, or a satellite). The terminal device may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, user equipment (UE), or the like.

The network device is a device in a wireless network. For example, the terminal device is connected to a radio access network (RAN) node of the wireless network. Currently, examples of some RAN nodes are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a base band unit (BBU), a wireless fidelity (Wi-Fi) access point (AP), or integrated access and backhaul (IAB), or the like. In a network structure, the network device may include a centralized unit (CU) node, or a distributed unit (DU) node, or a RAN device including a CU node and a DU node. In a network structure, the centralized unit CU node may be divided into a control plane (CU-CP) and a user plane (CU-UP). The CU-CP is responsible for a control plane function, and mainly includes radio resource control (RRC) and a packet data convergence protocol (PDCP)-C. The PDCP-C is mainly responsible for data encryption and decryption, integrity protection, data transmission, and the like on the control plane. The CU-UP is responsible for a user plane function, and mainly includes a service data adaptation protocol (SDAP) and a PDCP-U. The SDAP is mainly responsible for processing data of a core network and mapping a flow to a bearer. The PDCP-U is mainly responsible for encryption and decryption, integrity protection, header compression, serial number maintenance, data transmission, and the like on a data plane. The CU-CP and the CU-UP are connected through an E1 interface. The CU-CP indicates that the CU is connected to the core network through an Ng interface. The CU-CP is connected to the DU through F1-C (the control plane). The CU-UP is connected to the DU through F1-U (the user plane). Certainly, in another possible implementation, the PDCP-C is also in the CU-UP.

The network device in embodiments of this application may be a network device in an NTN system (for example, a satellite communication system, a high-altitude platform communication system, or another non-terrestrial communication system). For ease of description, the following embodiments of this application are described by using an example in which the network device is deployed on the satellite. In addition, for ease of description, the "network device on the satellite" is hereinafter replaced with the "satellite" in embodiments of this application. In other words, communication between the terminal device and the satellite described in the following embodiments of this application is actually communication between the terminal device and the network device on the satellite. Unified descriptions are provided herein, and details are not described below again.

A satellite system can be classified into the following three types based on a satellite height, namely, a satellite orbit height:

(1) High-earth orbit (Geostationary-Earth Orbit, GEO) satellite: The GEO satellite is also referred to as a geostationary satellite. The satellite moves at a same speed as an earth's rotation system. Therefore, the satellite remains stationary relative to ground. Correspondingly, a cell of the GEO satellite is also stationary. A coverage area of the GEO satellite cell is large. For example, a cell diameter may be 500 km.

(2) Low-earth orbit (LEO) satellite: The satellite, at a speed of about 7 km/s, moves fast relative to ground. Therefore, a service coverage area provided by the LEO satellite also moves.

(3) Medium-earth orbit satellite: The medium-earth orbit satellite is a satellite between a high-earth orbit satellite and a low-earth orbit satellite.

The satellite in embodiments of this application may be the low-earth orbit satellite, or may be expanded to the medium-earth orbit satellite or another mobile network device. For ease of description, the foregoing satellites are hereinafter referred to as satellites for short in embodiments of this application.

The satellite provides a service coverage area in either of the following modes:

The first mode is a transparent forwarding mode. The satellite forwards information about a cell of a terrestrial network device (for example, a base station, and the following uses an example in which the terrestrial network device is a terrestrial base station for description). In the transparent forwarding mode, a satellite cell may be terrestrially fixed or move as the satellite moves. That the satellite cell is terrestrially fixed means that the satellite cell is fixed within a coverage area of the ground. The satellite cell may be fixed in a period of time, or may be permanently fixed. That the satellite cell moves as the satellite moves means that when the satellite moves, the cell generated by the satellite also moves on the ground. When the satellite moves, if there is a connection between the satellite and an original base station, a possible manner is that a cell of the original base station follows the satellite for a period of time (in other words, the connection is maintained for a period of time). When the satellite is connected to a new base station, the satellite forwards information about a cell of the new base station. In the transparent forwarding mode, the satellite receives a signal from the terrestrial base station and forwards the signal to the ground. In this case, although the satellite keeps running, a position of the terrestrial base station does not change. Therefore, although a cell served by the terrestrial base station forwarded by the satellite moves as the satellite runs, a movement range of the cell is around the base station.

In a possible design, one cell may be identified by using a physical cell identifier (physical cell identifier, PCI) and a frequency, or a cell global identifier (CGI).

A second mode is a regenerative mode, in other words, the satellite may generate cell information by itself. For example, the satellite in this mode may include a DU, a base station, an IAB, or a network device with a similar function. In the regenerative mode, a satellite cell may be terrestrially fixed or move as the satellite moves. That the satellite cell is terrestrially fixed means that the satellite cell is fixed within a coverage area of the ground. The satellite cell may be fixed in a period of time, or may be permanently fixed. That the satellite cell moves as the satellite moves means that when the satellite moves, the cell generated by the satellite also moves on the ground. When the satellite moves, a possible implementation is that the cell generated by the satellite also moves on the ground. In other words, a network device on the satellite does not dynamically adjust a beam direction, and a beam generated by the network device on the satellite moves on the ground as the satellite moves.

For the foregoing two forms of satellites, when the network device in the NTN system keeps running, a ground terminal device needs to re-obtain corresponding satellite ephemeris information. In a conventional technology, the terminal device usually obtains satellite ephemeris information corresponding to a serving cell in which the terminal device is located. However, because a cell in the NTN system is a satellite cell with a large coverage area, there is a large amount of satellite ephemeris information corresponding to the satellite cell. Consequently, overheads are high when the terminal device obtains the satellite ephemeris information corresponding to the serving cell. However, in some application scenarios, the terminal device does not always need to obtain all satellite ephemeris information corresponding to the serving cell.

For example, in an application scenario of cell measurement, when the network device in the NTN system keeps running, the ground terminal device performs measurement on a serving cell or a neighboring cell of the serving cell, to perform cell reselection. When performing cell measurement, the terminal device needs to obtain satellite ephemeris information related to a current location of the UE, and does not need to obtain all satellite ephemeris information of the serving cell.

Therefore, a method for obtaining satellite ephemeris information in the conventional technology causes high overheads of the terminal device.

Figure 2:
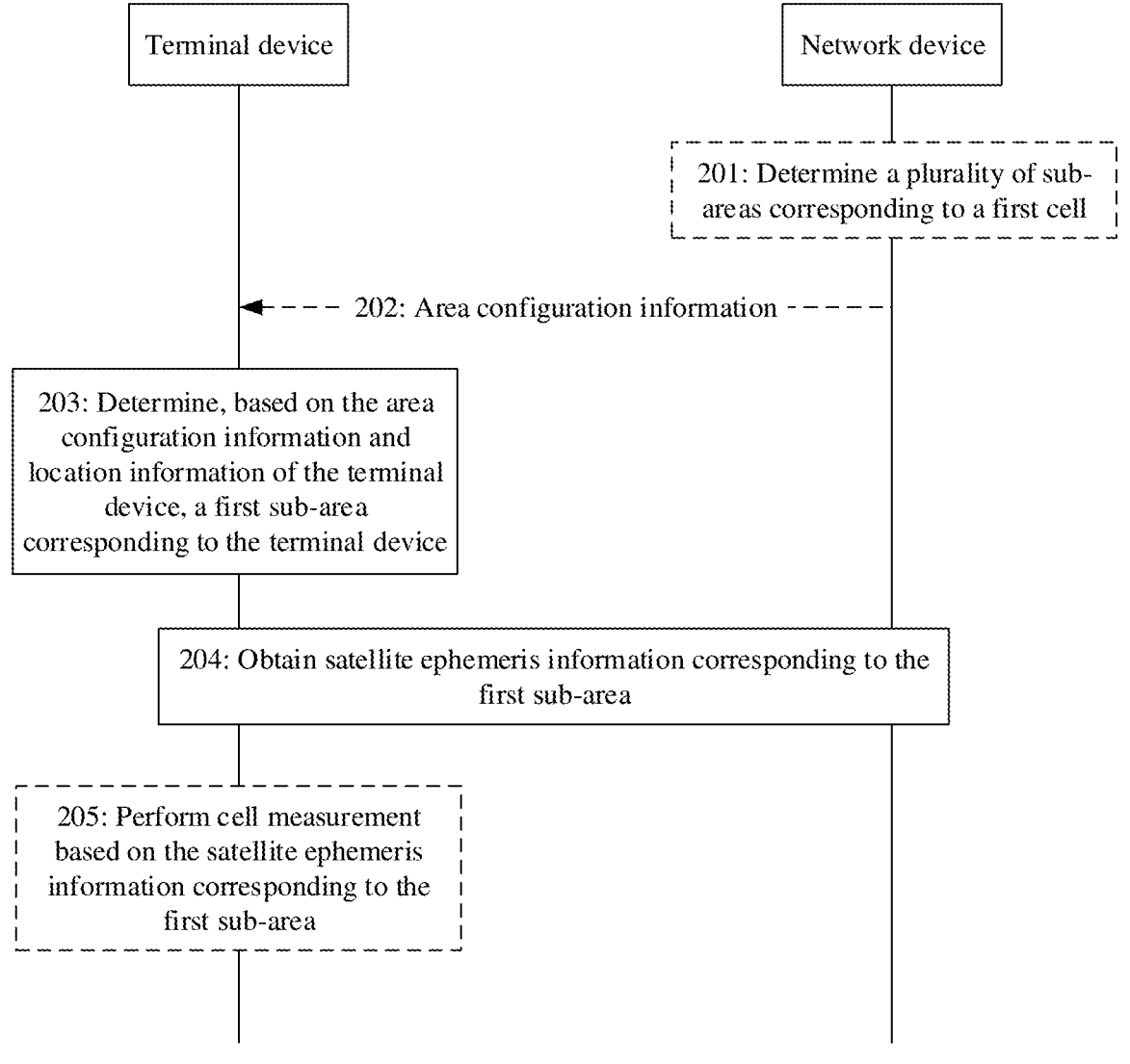
FIG. 2 is a schematic diagram of a communication method according to an embodiment of this application.

To resolve the foregoing problem, for example, with reference to the network architecture shown in FIG. 1, as shown in FIG. 2, an embodiment of this application provides a communication method. On a terminal device side, the method may be performed by a terminal device or a component (such as a chip or a circuit) used in the terminal device. On a network side, the method may be performed by a network device or a component (such as a chip or a circuit) used in the network device. For ease of description, an example in which the method is performed by the terminal device and the network device is used below for description.

The method includes the following steps.

Step 201: The network device determines a plurality of sub-areas corresponding to a first cell.

The first cell is a cell of the network device, in other words, the first cell is a satellite cell.

A sub-area represents an actual geographical area range, and a geographical area range including the plurality of sub-areas may cover a coverage area of the first cell. For example, the geographical area range including the plurality of sub-areas may be greater than or equal to the coverage area of the first cell.

Optionally, in this embodiment of this application, the network device may obtain the plurality of sub-areas based on the coverage area of the first cell, or another network element (for example, an operation administration and maintenance (OAM) network element) may obtain the plurality of sub-areas based on the coverage area of the first cell, and send information about the plurality of sub-areas to the network device.

A method for the network device or the another network element to obtain the plurality of sub-areas based on the coverage area of the first cell includes but is not limited to:

Division method 1: The coverage area of the first cell is divided into a plurality of non-overlapping or partially-overlapping sub-areas, and a geographical area range including the plurality of sub-areas is the same as the coverage area of the first cell.

Figure 3:
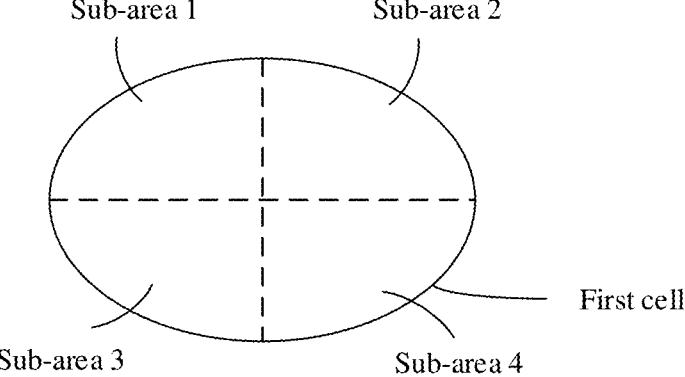
FIG. 3 is a schematic diagram of a first manner of area division.

FIG. 3 is a schematic diagram of a first manner of area division. A solid line represents a coverage area of the first cell, and dashed lines represent division of the coverage area of the first cell. The coverage area of the first cell is divided into a sub-area 1, a sub-area 2, a sub-area 3, and a sub-area 4.

It should be noted that, for example, FIG. 3 is merely a division manner, and there may be another division manner in actual application. For example, the first cell may be alternatively divided into a plurality of circular areas. A quantity of sub-areas and a division manner of the sub-areas are not specifically limited in this embodiment of this application. It may be understood that the sub-area is not equivalent to a cell. For example, in the division method shown in FIG. 3, it cannot be understood as that the first cell is divided into four cells, but should be understood as that the coverage area of the first cell may be divided into four geographical area ranges.

Division method 2: A first coverage area corresponding to the first cell is determined, the first coverage area is divided into a plurality of non-overlapping or partially-overlapping sub-areas, and a geographical area range including the plurality of sub-areas is greater than the coverage area of the first cell.

The first coverage area herein may be a smallest rectangular coverage area that covers the first cell, a smallest square coverage area that covers the first cell, or a smallest circular coverage area that covers the first cell, a smallest diamond coverage area that covers the first cell, a smallest coverage area that is in another shape and that covers the first cell, or the like.

The smallest rectangular coverage area that covers the first cell is a smallest rectangular coverage area that can cover an area corresponding to the first cell. The smallest square coverage area that covers the first cell is a smallest square coverage area that can cover an area corresponding to the first cell. The smallest circular coverage area that covers the first cell is a smallest circular coverage area that can cover an area corresponding to the first cell. The smallest diamond coverage area that covers the first cell is a smallest diamond coverage area that can cover an area corresponding to the first cell.

Figure 4:
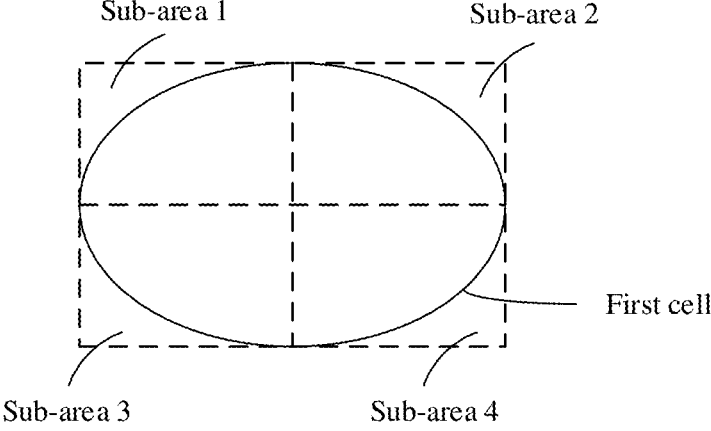
FIG. 4 is a schematic diagram of a second manner of area division.

FIG. 4 is a schematic diagram of a second manner of area division. In this example, an example in which the first coverage area is a smallest rectangular coverage area that covers the first cell is used for description. The smallest rectangular coverage area corresponding to the first cell is first determined, and then the rectangular coverage area is divided into four sub-areas: a sub-area 1, a sub-area 2, a sub-area 3, and a sub-area 4. A solid line represents a coverage area of the first cell, and dashed lines represent division of the coverage area of the first cell.

It should be noted that, in this embodiment of this application, the sub-area of the first cell may also be expressed as a sub-area corresponding to the first cell. The two sub-areas have a same meaning, and are uniformly described herein. For example, a first sub-area of the first cell may also be expressed as a first sub-area corresponding to the first cell, and a plurality of sub-areas of the first cell may also be expressed as the plurality of sub-areas corresponding to the first cell.

Step 202: The network device sends area configuration information to the terminal device. Correspondingly, the terminal device may receive the area configuration information.

The area configuration information indicates information about the plurality of sub-areas corresponding to the first cell.

The first cell is a current serving cell of the terminal device.

Optionally, the network device may send the area configuration information to all terminal devices in the first cell in a broadcast mode (for example, a system message). Alternatively, the network device may separately send the area configuration information to the terminal devices in the first cell in a unicast mode (for example, a dedicated radio resource control (RRC) message). Alternatively, the network device may send the area configuration information to a group of terminal devices in the first cell in a multicast mode (for example, a multicast message). This is not specifically limited in this embodiment of this application.

In an implementation, an example in which the first coverage area may be a smallest rectangular coverage area that covers the first cell or a smallest square coverage area that covers the first cell is used for description. The area configuration information may include at least one of a length of each of at least two sub-areas, a width of each sub-area, a total quantity of sub-areas in a longitude line direction, or a total quantity of sub-areas in a latitude line direction. Optionally, the configuration information may further include at least one of an identifier of each sub-area or a user readable name (human readable name, HRN) of each sub-area.

It should be noted that, the foregoing step 201 and step 202 are optional steps. For example, in an implementation, if step 201 and step 202 are not performed, the information about the plurality of sub-areas corresponding to the first cell may be configured for the terminal device in a preconfiguration manner. For another example, in another implementation, if step 201 is performed but step 202 is not performed, a third-party platform may obtain, from the network device, the information about the plurality of sub-areas corresponding to the first cell, and then configure, for the terminal device by using the third-party platform, the information about the plurality of sub-areas corresponding to the first cell.

Step 203: The terminal device determines, based on the area configuration information and location information of the terminal device, a first sub-area corresponding to the terminal device.

A manner in which the terminal device determines a location of the terminal device may be that the terminal device determines the location information of the terminal device by using a global navigation satellite system (GNSS), or may be that the terminal device receives the location information of the terminal device that is sent by the network device. The GNSS may include at least one of a global positioning system (GPS), the global navigation satellite system, a BeiDou navigation satellite system (BDS), a quasi-zenith satellite system (QZSS), or a satellite based augmentation system (SBAS), and another positioning system.

The terminal device determines, based on the location information of the terminal device, that a sub-area that is in the plurality of sub-areas corresponding to the first cell and that covers the geographical location indicated by the location information is the first sub-area corresponding to the terminal device. In other words, the first sub-area is one of the plurality of sub-areas corresponding to the first cell, and the terminal device is located in a coverage area of the first sub-area. It may be understood that, if the terminal device is located in an overlapping coverage area of the plurality of sub-areas, how the terminal device determines the first sub-area may be implemented by the terminal device, or may be determined by the terminal device according to a rule sent by the network device or a rule predefined in a protocol. In an example, the foregoing rule may be determined by the terminal device based on distance information between the terminal device and a reference point in the sub-area. Optionally, the reference point may be sent by the network device, or may be predefined in a protocol, for example, a center point of a sub-area.

In this implementation, the location information of the terminal device obtained by the terminal device may be location coordinates (x, y) of a current geographical location of the terminal device. x is a distance from the terminal device to a longitude direction of a relative reference point of a location system used by the terminal device, and y is a distance from the terminal device to a latitude direction of the relative reference point of the location system.

In this embodiment of this application, a manner in which the terminal device determines the location information of the terminal device is described by using an example in which the location information of the terminal device is determined based on the GNSS system, or may be extended to another positioning system. This is not specifically limited in this embodiment of this application.

An example in which location information of a reference point of the GNSS system is (0, 0) is used for description. Certainly, the location information of the reference point may alternatively be other information. This is not specifically limited in this embodiment of this application.

In this implementation, that the terminal device determines the first sub-area based on the location information of the terminal device and the area configuration information may be: The terminal device determines a location of the terminal device in the longitude direction based on a distance in the longitude direction of the terminal device, the length of each sub-area, and the total quantity of sub-areas in the longitude line direction; determines a location of the terminal device in the latitude direction based on a distance in the latitude direction of the terminal device, the width of each sub-area, and the total quantity of sub-areas in the latitude line direction; and then, determines an identifier of the sub-area based on the location in the longitude direction and the location in the latitude direction, and a sub-area identified by the identifier of the sub-area is the first sub-area.

Optionally, the location of the terminal device in the longitude direction satisfies the following formula (1):

$$x_1 = \lfloor x/L \rfloor \% Nx \qquad (1)$$

Optionally, the location of the terminal device in the latitude direction satisfies the following formula (2):

$$y_1 = \lfloor y/W \rfloor \% Ny \qquad (2)$$

The identifier of the sub-area satisfies the following formula (3):

$$zone\_id = y_i * Nx + x_1 \qquad (3)$$

x is a distance from the terminal device to the longitude direction of a relative reference point of a location system used by the terminal device: y is a distance from the terminal device to the latitude direction of a relative reference point of the location system: L is a length of each sub-area: W is a width of each sub-area: Nx is a total quantity of sub-areas in the longitude direction; Ny is a total quantity of sub-areas in the latitude direction: $x_1$ is a location of the terminal device in the longitude direction: $y_1$ is a location of the terminal device in the latitude direction: zone_id is the identifier of the sub-area determined by the terminal device: a symbol $\lfloor \ \rfloor$ represents rounding down; and a symbol % represents modulo.

For example, geographical location coordinates at which the terminal device is currently located are (500, 500), a total quantity of sub-areas in both the longitude line direction and the latitude line direction is 4 (in other words, the first cell is divided into 16 sub-areas), and a length and a width of each sub-area are both 200. The terminal device may determine $x_1 = \lfloor 500/200 \rfloor \% 4 = 2$ according to the foregoing formula (1), determine $y_1 = \lfloor 500/200 \rfloor \% 4 = 2$ according to the foregoing formula (2), and determine that the identifier of the sub-area is zone_id=2*4+2=10 according to the foregoing formula (3). In this case, the terminal device determines a sub-area whose identifier is 10 as the first sub-area.

It may be understood that the foregoing embodiment is merely used as an example and does not constitute a limitation. In still another possible implementation, the location information of the terminal may alternatively be a place name or the like (which is corresponding to a user readable name). For example, a location is determined as an XX road, and a sub-area is an XX street or district.

In an alternative implementation, step 202 and step 203 may not be performed after step 201 is performed. Instead, the network device determines, based on the location information of the terminal device and the plurality of sub-areas corresponding to the first cell, a first sub-area in which the terminal device is located; and then, the network device sends satellite ephemeris information corresponding to the first sub-area to the terminal device. In some embodiments, only the satellite ephemeris information corresponding to the first sub-area may be sent, or satellite ephemeris information corresponding to the plurality of sub-areas may be sent, where the satellite ephemeris information corresponding to the plurality of sub-areas includes the satellite ephemeris information corresponding to the first sub-area.

Step 204: The terminal device obtains the satellite ephemeris information corresponding to the first sub-area.

The satellite ephemeris information corresponding to the first sub-area includes one or more of the following: satellite ephemeris information of a satellite in the first sub-area at a current moment, first time information, satellite ephemeris information of a satellite that is to run to the first sub-area at first time, satellite ephemeris information of a satellite that is in a neighboring area of the first sub-area at the current moment, second time information, and satellite ephemeris information of a satellite that is to run to the neighboring area of the first sub-area at second time. The first time information and the second time information may be the same or may be different. The first time information and the second time information may each be information about a time period, or moment information, where the moment information may be a predefined moment that is at a fixed interval from a current moment.

The following provides three implementation methods for the terminal device to obtain the satellite ephemeris information corresponding to the first sub-area.

Implementation method 1: The terminal device sends first indication information to the network device, where the first indication information requests the satellite ephemeris information corresponding to the first sub-area. The network device sends the satellite ephemeris information corresponding to the first sub-area to the terminal device.

The network device may send, to the terminal device in a unicast mode (for example, by using a dedicated RRC message), a multicast mode (for example, by using a multicast message), or a broadcast mode (for example, by using a system message), the satellite ephemeris information corresponding to the first sub-area.

The first indication information may be used to determine information about the first sub-area. The information about the first sub-area includes one or more of the following: an identifier of the first sub-area, a central location coordinate of the first sub-area, or a user readable name of the first sub-area. After receiving the first indication information, the network device determines, based on the first indication information, the information about the first sub-area and the satellite ephemeris information corresponding to the first sub-area. The network device sends the satellite ephemeris information corresponding to the first sub-area to the terminal device.

Based on this implementation method, the network device may not need to send satellite ephemeris information corresponding to a serving cell of the terminal device and all satellite cells surrounding the serving cell. This can reduce overheads of air interface signaling.

The following provides different implementation methods of the first indication information.

In an implementation method, the first indication information includes one or more of an identifier of the first sub-area, a central location coordinate of the first sub-area, or a user readable name of the first sub-area.

Based on this implementation method, after receiving the first indication information, the network device determines the information about the first sub-area, and sends the satellite ephemeris information corresponding to the first sub-area to the terminal device.

In another implementation method, the first indication information includes a first preamble. The first preamble corresponds to the first sub-area.

Based on this implementation method, before step 204, the terminal device may receive a correspondence between information about the first preamble and a first sub-area from the network device. The information about the first preamble herein may be the first preamble or indication information (for example, at least one of an index of the first preamble, an identifier of the first preamble, and a root sequence used to determine the first preamble) used to determine the first preamble. Therefore, after determining the first sub-area in step 203, the terminal device may determine the information about the first preamble based on the correspondence between a first sub-area and information about the first preamble. If the information about the first preamble is the indication information used to determine the first preamble, the terminal device further determines the first preamble based on the information about the first preamble, and then sends the first preamble to the network device. After receiving the first preamble, the network device determines the information about the first sub-area based on the first preamble, and sends the satellite ephemeris information corresponding to the first sub-area to the terminal device.

In another implementation method, the first indication information includes the first preamble. The first preamble and a first access resource correspond to the first sub-area, and the first access resource is a physical time resource and/or a physical frequency resource that are/is used to send the first preamble.

Based on this implementation method, before step 204, the terminal device may receive a correspondence between information about the first preamble and information about the first access resource and a first sub-area from the network device. The information about the first preamble herein may be the first preamble or indication information (for example, at least one of an index of the first preamble, an identifier of the first preamble, and a root sequence used to determine the first preamble) used to determine the first preamble. The information about the first access resource herein may be the first access resource or configuration information (for example, an index of the first access resource or an identifier of the first access resource) used to determine the first access resource. Therefore, after determining the first sub-area in step 203, the terminal device may determine information about the first preamble and information about the first access resource based on the correspondence between a first sub-area and information about the first preamble and information about the first access resource. If the information about the first preamble is indication information used to determine the first preamble, the terminal device further determines the first preamble based on the information about the first preamble; or if the information about the first access resource is the configuration information used to determine the first access resource, the terminal device further determines the first access resource based on the information about the first access resource, and then the terminal device sends the first preamble on the first access resource. After receiving the first preamble on the first access resource, the network device may determine the information about the first sub-area based on the correspondence between a first preamble, a first access resource, and a first sub-area, and send the satellite ephemeris information corresponding to the first sub-area to the terminal device.

It should be noted that, when the network device receives the first preamble on another access resource other than the first access resource, the network device performs other processing, for example, random access related processing. For details, refer to the conventional technology. Details are not described herein.

In another implementation method, the first indication information includes bitmap information. The bitmap information indicates the first sub-area.

FIG. 3 or FIG. 4 is used as an example. The network device divides the first cell into four sub-areas, and the bitmap information may be four bits. For example, a $1^{st}$ bit corresponds to a $1^{st}$ sub-area of four sub-areas, a $2^{nd}$ bit corresponds to a $2^{nd}$ sub-area of the four sub-areas, a $3^{rd}$ bit corresponds to a $3^{rd}$ sub-area of the four sub-areas, and a 4th bit corresponds to a 4th sub-area of the four sub-areas. Based on this example, when the bitmap information is 1000, the bitmap information indicates the $1^{st}$ sub-area, in other words, the first sub-area is the $1^{st}$ sub-area. Alternatively, when the bitmap information is 0001, the bitmap information indicates the $1^{st}$ sub-area. An indication relationship between bitmap information and a sub-area is not limited in this embodiment.

After receiving the bitmap information, the network device determines the information about the first sub-area, and sends the satellite ephemeris information corresponding to the first sub-area to the terminal device.

Optionally, an arrangement order of the sub-areas may be determined by the network device. For example, all the sub-areas are sorted in sequence in a longitude direction and then in a latitude direction. Alternatively, sorting is performed based on identifiers of the sub-areas. Optionally, the area configuration information in the foregoing step 202 may carry a sorting sequence of the sub-areas.

When the area configuration information in step 202 does not carry the sorting sequence of the sub-areas, the terminal device may determine the sorting sequence of the sub-areas. For a method for determining the sorting sequence of the sub-areas by the terminal device, refer to the method for determining the sorting sequence of the sub-areas. Details are not described again.

Implementation method 2: The terminal device sends second indication information to the network device, where the second indication information requests satellite ephemeris information respectively corresponding to the at least two sub-areas of the first cell. The network device sends the satellite ephemeris information to the terminal device, where the satellite ephemeris information includes at least the satellite ephemeris information corresponding to the at least two sub-areas of the first cell. The satellite ephemeris information corresponding to the at least two sub-areas of the first cell includes the satellite ephemeris information corresponding to the first sub-area. The terminal device obtains, based on the received satellite ephemeris information corresponding to the at least two sub-areas of the first cell, the satellite ephemeris information corresponding to the first sub-area.

For specific descriptions of the satellite ephemeris information, refer to other descriptions in this embodiment of this application. Details are not described herein again.

Optionally, the satellite ephemeris information corresponding to the at least two sub-areas of the first cell includes the satellite ephemeris information respectively corresponding to all sub-areas of the first cell.

Optionally, the satellite ephemeris information corresponding to the at least two sub-areas of the first cell includes satellite ephemeris information respectively corresponding to some sub-areas of the first cell. In addition to the satellite ephemeris information corresponding to the first sub-area, the some sub-areas may further include a neighboring sub-area of the first sub-area, or may include a sub-area determined by the terminal device based on a running line of the terminal device, or may further include a sub-area sent by another terminal device. It may be understood that the satellite ephemeris information that is of the at least two sub-areas of the first cell and that is sent by the network device may be the same as or different from the satellite ephemeris information of the at least two sub-areas requested by the second indication information. For example, the second indication information requests satellite ephemeris information of the sub-area 1 and the sub-area 2. For example, the network device may send the satellite ephemeris information of the sub-area 1 and the sub-area 2, or send satellite ephemeris information of the sub-area 1, the sub-area 2, and the sub-area 3, or send satellite ephemeris information of the sub-area 1, the sub-area 2, the sub-area 3, and the sub-area 4.

Any one of the at least two sub-areas of the first cell sent by the network device is referred to as a second sub-area, and the second sub-area may be the same as or different from the first sub-area. Satellite ephemeris information corresponding to the second sub-area includes one or more of the following: satellite ephemeris information of a satellite in the second sub-area at a current moment, third time information, satellite ephemeris information of a satellite that is to run to the second sub-area at the third time, satellite ephemeris information of a satellite that is in a neighboring area of the second sub-area at a current moment, fourth time information, and satellite ephemeris information of a satellite that is to run to the neighboring area of the second sub-area at the fourth time. The third time information and the fourth time information may be the same or may be different. The third time information and the fourth time information may each be information about a time period, or moment information, where the moment information may be a predefined moment that is at a fixed interval from a current time point.

The network device may send, to the terminal device in a unicast mode (for example, by using a dedicated RRC message), a multicast mode (for example, by using a multicast message), or a broadcast mode (for example, by using a system message), the satellite ephemeris information respectively corresponding to the sub-areas of the first cell.

Based on this implementation method, the network device may send the satellite ephemeris information respectively corresponding to the sub-areas of the first cell, so that the another terminal device is prevented from requesting satellite ephemeris information corresponding to a sub-area, and power consumption of the another terminal device is reduced.

The following provides different implementation methods of the second indication information.

In an implementation method, the second indication information includes a second preamble. The second preamble corresponds to a first system message.

Based on the implementation method, before step 204, the terminal device may receive a correspondence between information about the second preamble and a first system message from the network device. The information about the second preamble herein may be the second preamble or indication information (for example, at least one of an index of the second preamble, an identifier of the second preamble, and a root sequence used to determine the second preamble) used to determine the second preamble. If the information about the second preamble is the indication information used to determine the second preamble, the terminal device further determines the second preamble based on the information about the second preamble, and then sends the second preamble to the network device. After receiving the second preamble, the network device determines the first system message based on the information about the second preamble, and sends the first system message to the terminal device. The first system message carries the satellite ephemeris information respectively corresponding to the at least two sub-areas of the first cell.

The first system message may indicate a system information (SI) or a system information block (SIB), and the SI may include at least one SIB.

In another implementation method, the second indication information includes the second preamble. The second preamble and a second access resource correspond to the first system message, and the second access resource is a physical time resource and/or a physical frequency resource that are/is used to send the second preamble.

Based on the implementation method, before step 204, the terminal device may receive a correspondence between information about the second preamble, information about the second access resource, and a first system message from the network device. The information about the second preamble herein may be the second preamble or indication information (for example, at least one of an index of the second preamble, an identifier of the second preamble, and a root sequence used to determine the second preamble) used to determine the second preamble. The information about the second access resource herein may be the second access resource or configuration information used to determine the second access resource (for example, an index of the second access resource or an identifier of the second access resource). If the information about the second preamble is indication information used to determine the second preamble, the terminal device further determines the second preamble based on the information about the second preamble: or if the information about the second access resource is the configuration information used to determine the second access resource, the terminal device further determines the second access resource based on the information about the second access resource, and then the terminal device may send the second preamble on the second access resource. After receiving the second preamble on the second access resource, the network device may determine the first system message based on the correspondence between information about the second preamble, information about the second access resource, and a first system message, and send the first system message to the terminal device. The first system message carries the satellite ephemeris information respectively corresponding to the sub-areas of the first cell.

It should be noted that, when the network device receives the second preamble on another access resource other than the second access resource, the network device performs other processing, for example, random access related processing. For details, refer to the conventional technology. Details are not described herein.

Implementation method 3: The terminal device does not need to send indication information (for example, the first indication information or the second indication information) to the network device. In other words, the network device actively sends the satellite ephemeris information respectively corresponding to the sub-areas of the first cell to the terminal device. The network device may send a same message including the satellite ephemeris information and the area configuration information that are respectively corresponding to the sub-areas of the first cell to the terminal device, or may send different messages including the satellite ephemeris information and the area configuration information that are respectively corresponding to the sub-areas of the first cell to the terminal device. This is not specifically limited in this embodiment of this application.

Based on this implementation method, the network device may send the satellite ephemeris information respectively corresponding to the sub-areas of the first cell, so that the terminal device is prevented from requesting satellite ephemeris information corresponding to a sub-area, and power consumption of the terminal device is reduced.

Based on the implementation method 2 or the implementation method 3, optionally, the network device may send the information about the plurality of sub-areas to the terminal device implicitly or explicitly. For example, the network device sends a satellite ephemeris information list. A $1^{st}$ piece of satellite ephemeris information in the satellite ephemeris information list is satellite ephemeris information corresponding to the sub-area 1, a $2^{nd}$ piece of satellite ephemeris information is satellite ephemeris information corresponding to the sub-area 2, and so on. Alternatively, the network device sends explicit indication information used to determine the information about the sub-area. For example, the network device sends an identifier 1 of the sub-area and satellite ephemeris information corresponding to the identifier 1, an identifier 2 of the sub-area and satellite ephemeris information corresponding to the identifier 2, an identifier 3 of the sub-area and satellite ephemeris information corresponding to the identifier 3, and the like. For example, the first cell corresponds to four sub-areas, the network device sends satellite ephemeris information respectively corresponding to the four sub-areas in a broadcast mode, and the terminal device may determine, based on a sub-area in which the terminal device is located (in other words, the first sub-area determined in step 203), satellite ephemeris information required by the terminal device, and obtain the satellite ephemeris information corresponding to the first sub-area from the satellite ephemeris information that is corresponding to the plurality of sub-areas and that is sent in the broadcast mode.

Optionally, based on the implementation method 1, the implementation method 2, or the implementation method 3, the network device may further send third indication information to the terminal device, where the third indication information indicates that the network device sends satellite ephemeris information corresponding to which sub-area or sub-areas. Optionally, the third indication information may be identification information of the sub-area. In an implementation, the third indication information may be carried in the system message. For example, when satellite ephemeris information is sent to different terminal devices in the broadcast mode by using a same system message, to avoid blind waiting or incorrect reading of some terminal devices, the third indication information may be further carried in a SIB 1, where the third indication information indicates that the network device sends satellite ephemeris information corresponding to which sub-area or sub-areas. For example, with reference to the foregoing implementation method 1, the network device may send, by using a same SIB x, satellite ephemeris information corresponding to the sub-area 1 and the sub-area 2. When terminal device 1 in the sub-area 1 requests, from the network device, the satellite ephemeris information corresponding to the sub-area 1, the network device sends the SIB 1 to the terminal device in the first cell in the broadcast mode, and the SIB 1 carries the third indication information, where the third indication information indicates that the satellite ephemeris information corresponding to the sub-area 1 is sent by the network device by using the SIB x. By reading the third indication information, a terminal device (including the terminal device 1) in the sub-area 1 may determine that satellite ephemeris information in the SIB x is satellite ephemeris information required by the terminal devices, and a terminal device (for example, including terminal device 2) in the sub-area 2 may determine that the satellite ephemeris information in the SIB x is not satellite ephemeris information required by the terminal devices. The terminal device in the sub-area 1 reads the SIB x to obtain the satellite ephemeris information corresponding to the sub-area 1. The terminal device in the sub-area 2 does not read the SIB x, so that overheads of power consumption can be reduced. In another implementation, the third indication information may be carried in a response message. For example, when the terminal device 1 in the sub-area 1 requests, from the network device, satellite ephemeris information corresponding to the sub-area 1, the response message sent by the network device to the terminal device 1 may carry the third indication information, where the third indication information indicates that the network device sends satellite ephemeris information corresponding to which sub-area or sub-areas. Certainly, with reference to the implementation method 2 or the implementation method 3, the network device may alternatively include, in the SIB x, both the satellite ephemeris information corresponding to the sub-area 1 and the satellite ephemeris information corresponding to the sub-area 2, and indicate, by using indication information, which satellite ephemeris information corresponds to the sub-area 1 and which satellite ephemeris information corresponds to the sub-area 2.

In the foregoing solution, the sub-area is introduced, and the terminal device only needs to obtain satellite ephemeris information corresponding to the sub-area in which the terminal device is located. This reduces an amount of the satellite ephemeris information obtained by the terminal device, and therefore can reduce overheads of the terminal device.

Optionally, in an application scenario of cell measurement, the obtained satellite ephemeris information is used for cell measurement. In this case, after step 204, the method may further include the following step.

Step 205: The terminal device performs cell measurement based on the satellite ephemeris information corresponding to the first sub-area.

The terminal device may perform cell measurement by using a related method in the conventional technology. This is not limited in this embodiment of this application. After detecting a proper cell through measurement, the terminal device may reselect the proper cell.

In the foregoing solution, the sub-area is introduced, and the terminal device only needs to measure a cell of the sub-area corresponding to the terminal device. Therefore, a quantity of measured cells is reduced, and measurement overheads of the terminal device can be reduced.

It may be understood that, when the network device includes a CU and a DU:

Optionally, if the CU determines the plurality of sub-areas corresponding to the first cell, the CU may send the area configuration information to the DU. Optionally, if the DU determines the plurality of sub-areas corresponding to the first cell, the DU may send the area configuration information to the CU. For descriptions of the area configuration information, refer to descriptions of step 202. That the CU or the DU determines the plurality of sub-areas corresponding to the first cell may be that the CU or the DU determines the plurality of sub-areas, or may be that the CU or the DU obtains the plurality of sub-areas from another network element (for example, an OAM network element).

Optionally, if the CU receives the first indication information sent by the terminal device, the CU may determine the information about the first sub-area based on the first indication information. The CU may send the satellite ephemeris information corresponding to the first sub-area to the terminal device by using the DU. In a possible implementation, the CU may send indication information used to determine the first sub-area to the DU, where the indication information is used by the DU to determine one or more of the following: an identifier of the first sub-area, a central location coordinate of the first sub-area, or a user readable name of the first sub-area. The DU sends the satellite ephemeris information corresponding to the first sub-area to the terminal device. In another possible implementation, the CU may send the satellite ephemeris information corresponding to the first sub-area to the DU. Then the DU sends the satellite ephemeris information corresponding to the first sub-area to the terminal device.

Optionally, if the DU receives the first indication information sent by the terminal device, the DU may determine the information about the first sub-area based on the first indication information. The DU may send the satellite ephemeris information corresponding to the first sub-area to the terminal device. Alternatively, the DU may send a request message to the CU, to request the CU to send the satellite ephemeris information corresponding to the first sub-area. The request message may include the indication information used by the CU to determine the first sub-area. The indication information is used by the CU to determine one or more of the following: an identifier of the first sub-area, a central location coordinate of the first sub-area, or a user readable name of the first sub-area.

Optionally, if the CU receives the second indication information sent by the terminal device, the CU may determine information about the at least two sub-areas of the first cell based on the second indication information. The CU may send the satellite ephemeris information respectively corresponding to the at least two sub-areas of the first cell to the terminal device by using the DU. In a possible implementation, the CU may send, to the DU, indication information used to determine the at least two sub-areas of the first cell, where the indication information is used by the DU to determine one or more of the following: identifiers of the at least two sub-areas of the first cell, central location coordinates of the at least two sub-areas of the first cell, or user readable names of the at least two sub-areas of the first cell. The DU sends the satellite ephemeris information respectively corresponding to the at least two sub-areas of the first cell to the terminal device. In another possible implementation, the CU may send the satellite ephemeris information respectively corresponding to the at least two sub-areas of the first cell to the DU. Then the DU sends the satellite ephemeris information respectively corresponding to the at least two sub-areas of the first cell to the terminal device.

Optionally, if the DU receives the second indication information sent by the terminal device, the DU may determine the information about the at least two sub-areas of the first cell based on the second indication information, and then the DU may send a request message to the CU, to request the CU to send the satellite ephemeris information corresponding to the at least two sub-areas of the first cell. The request message may include the indication information used by the CU to determine the at least two sub-areas of the first cell. The indication information is used by the CU to determine one or more of the following: identifiers of the at least two sub-areas of the first cell, central location coordinates of the at least two sub-areas of the first cell, or user readable names of the at least two sub-areas of the first cell.

Optionally, the CU may further send the third indication information to the DU, and then the DU sends the third indication information to the terminal device.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

In each embodiment of embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing method embodiments, the method implemented by the terminal device may also be implemented by a component (for example, a chip or a circuit) used in the terminal device. The method implemented by the network device may also be implemented by a component (for example, a chip or a circuit) used in the network device. This is not limited in embodiments of this application.

Figure 5:
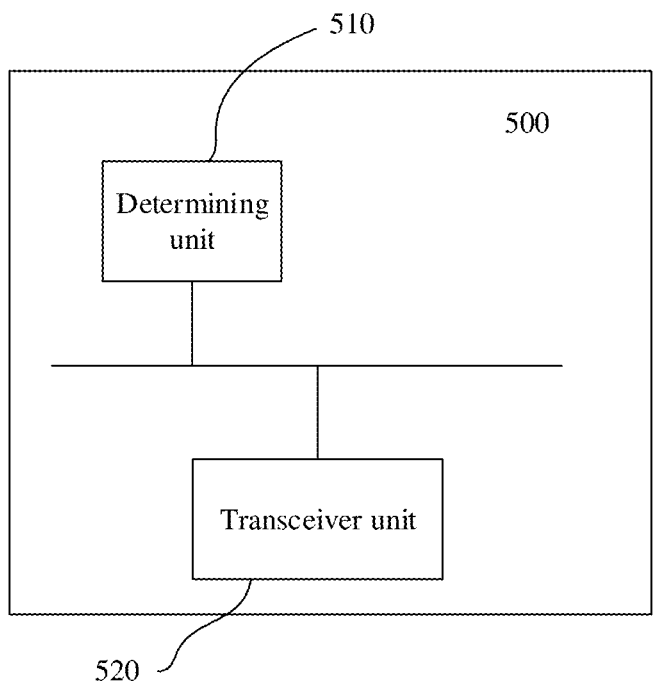
FIG. 5 is a schematic diagram of a communication apparatus according to an embodiment of this application.

FIG. 5 is a block diagram of a possible example of a communication apparatus 500 according to an embodiment of this application. The communication apparatus 500 may exist in a form of software or hardware. The communication apparatus 500 may include a determining unit 510 and a transceiver unit 520. The transceiver unit 520 is configured to support the communication apparatus 500 in communicating with another network entity or another module in the communication apparatus 500. Optionally, the communication apparatus 500 may further include a storage unit. The storage unit may be configured to store instructions and/or data. The storage unit is configured to store data or instructions (which may also be referred to as code or a program). The foregoing units may interact with or be coupled to the storage unit, to implement a corresponding method or function. For example, the determining unit 510 may read the data or the instructions in the storage unit, so that the communication apparatus implements the methods in the foregoing embodiments.

In a possible manner, the determining unit 510 may be integrated into a processing unit, and the processing unit may be a processor or a controller, for example, may be a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit can implement or execute various example logical blocks, modules, and circuits described with reference to content disclosed in embodiments of this application. Alternatively, the processor may be a combination of processors implementing a computing function, for example, a combination of one or more microprocessors, or a combination of a DSP and a microprocessor. The transceiver unit 520 may be a communication interface, a transceiver, a transceiver circuit, or the like. The communication interface is a general term. In some embodiments, the communication interface may include at least one interface.

The communication apparatus 500 may be a terminal device configured to perform the embodiment corresponding to FIG. 2, or may be a chip configured to perform steps corresponding to the terminal device in the embodiment corresponding to FIG. 2. For example, the determining unit 510 is integrated into the processing unit. The processing unit may be, for example, a processor. The transceiver unit 520 may be, for example, a transceiver. The transceiver includes a radio frequency circuit. For another example, the transceiver unit 520 may alternatively be a pin, a circuit, a communication interface, an input/output interface, or the like.

In an embodiment, the communication apparatus 500 may be a terminal device or a chip used in the terminal device, and the communication apparatus 500 may be configured to perform one or more of the following methods.

The determining unit 510 is configured to determine, based on area configuration information of a first cell of a network device and location information of the terminal device, a first sub-area corresponding to the terminal device, where the area configuration information indicates information about a plurality of sub-areas corresponding to the first cell, and the plurality of sub-areas include the first sub-area. The transceiver unit 520 obtains satellite ephemeris information corresponding to the first sub-area.

In some possible implementations, the transceiver unit 520 is configured to: send first indication information to the network device, to request to obtain the satellite ephemeris information corresponding to the first sub-area; and receive the satellite ephemeris information corresponding to the first sub-area from the network device.

In some possible implementations, the first indication information includes one or more of an identifier of the first sub-area, a central location coordinate of the first sub-area, or a user readable name of the first sub-area: or the first indication information includes bitmap information, where the bitmap information indicates the first sub-area.

In some possible implementations, the first indication information includes a first preamble, where the first preamble corresponds to the first sub-area.

In some possible implementations, that the transceiver unit 520 is configured to send first indication information to the network device includes: sending the first preamble to the network device on a first access resource, where the first preamble and the first access resource correspond to the first sub-area.

In some possible implementations, that the transceiver unit 520 is configured to obtain the satellite ephemeris information corresponding to the first sub-area includes: receiving, from the network device, satellite ephemeris information respectively corresponding to at least two sub-areas of the first cell, where the at least two sub-areas include the first sub-area; and obtaining, from the satellite ephemeris information respectively corresponding to the at least two sub-areas of the first cell, the satellite ephemeris information corresponding to the first sub-area.

In some possible implementations, the transceiver unit 520 is further configured to: before receiving, from the network device, the satellite ephemeris information respectively corresponding to the at least two sub-areas of the first cell, send second indication information to the network device, to request to obtain the satellite ephemeris information respectively corresponding to the at least two sub-areas of the first cell.

In some possible implementations, the second indication information includes a second preamble, where the second preamble corresponds to a first system message; and that the transceiver unit 520 is configured to receive, from the network device, satellite ephemeris information respectively corresponding to the at least two sub-areas of the first cell includes: The transceiver unit 520 is configured to receive, from the network device, the first system message corresponding to the second preamble, where the first system message includes the satellite ephemeris information respectively corresponding to the at least two sub-areas of the first cell.

In some possible implementations, that the transceiver unit 520 is configured to send second indication information to the network device includes: The transceiver unit 520 is configured to send the second preamble to the network device on a second access resource. That the transceiver unit 520 is configured to receive, from the network device, the first system message corresponding to the second preamble includes: The transceiver unit 520 is configured to receive, from the network device, the first system message corresponding to the second preamble and the second access resource.

In some possible implementations, the transceiver unit 520 is further configured to receive third indication information from the network device, where the third indication information indicates information about a sub-area corresponding to satellite ephemeris information sent by the network device.

In some possible implementations, the transceiver unit 520 is further configured to receive the area configuration information corresponding to the first cell from the network device.

In some possible implementations, the satellite ephemeris information corresponding to the first sub-area includes one or more of the following: satellite ephemeris information of a satellite in the first sub-area at a current moment, first time information, satellite ephemeris information of a satellite that is to run to the first sub-area at first time, satellite ephemeris information of a satellite that is in a neighboring area of the first sub-area at the current moment, second time information, and satellite ephemeris information of a satellite that is to run to the neighboring area of the first sub-area at second time.

In some possible implementations, a geographical area range including the plurality of sub-areas corresponding to the first cell is the same as a coverage area of the first cell: or a geographical area range including the plurality of sub-areas corresponding to the first cell is greater than a coverage area of the first cell.

In another embodiment, the communication apparatus 500 may be a network device or a chip used in the network device, and the communication apparatus 500 may be configured to perform one or more of the following methods.

The determining unit 510 is configured to determine the plurality of sub-areas corresponding to the first cell of the network device. The transceiver unit 520 is configured to send the area configuration information to the terminal device, where the area configuration information indicates information about the plurality of sub-areas corresponding to the first cell, the plurality of sub-areas include the first sub-area, the area configuration information is used by the terminal device to obtain the satellite ephemeris information corresponding to the first sub-area, and the first sub-area is a sub-area in which the terminal device is located.

In some possible implementations, the transceiver unit 520 is further configured to receive the first indication information from the terminal device, where the first indication information requests to obtain the satellite ephemeris information corresponding to the first sub-area; and send the satellite ephemeris information corresponding to the first sub-area to the terminal device.

In some possible implementations, the first indication information includes one or more of an identifier of the first sub-area, a central location coordinate of the first sub-area, or a user readable name of the first sub-area: or the first indication information includes bitmap information, where the bitmap information indicates the first sub-area.

In some possible implementations, the first indication information includes the first preamble, where the first preamble corresponds to the first sub-area.

In some possible implementations, that the transceiver unit 520 is configured to receive the first indication information from the terminal device includes: The transceiver unit 520 is configured to receive the first preamble from the terminal device on the first access resource, where the first preamble and the first access resource correspond to the first sub-area.

In some possible implementations, the transceiver unit 520 is further configured to send, to the terminal device, the satellite ephemeris information respectively corresponding to the at least two sub-areas of the first cell, where the at least two sub-areas include the first sub-area.

In some possible implementations, the transceiver unit 520 is further configured to: before sending, to the terminal device, the satellite ephemeris information respectively corresponding to the at least two sub-areas of the first cell, receive the second indication information from the terminal device, where the second indication information requests to obtain the satellite ephemeris information respectively corresponding to the at least two sub-areas of the first cell.

In some possible implementations, the second indication information includes the second preamble, where the second preamble corresponds to the first system message. That the transceiver unit 520 is configured to send, to the terminal device, the satellite ephemeris information respectively corresponding to the at least two sub-areas of the first cell includes: sending, to the terminal device, the first system message corresponding to the second preamble, where the first system message includes the satellite ephemeris information respectively corresponding to the at least two sub-areas of the first cell.

In some possible implementations, that the transceiver unit 520 is configured to receive second indication information from the terminal device includes: The transceiver unit 520 is configured to receive the second preamble from the terminal device on the second access resource. That the transceiver unit 520 is configured to send, to the terminal device, the first system message corresponding to the second preamble includes: The transceiver unit 520 is configured to send, to the terminal device, the first system message corresponding to the second preamble and the second access resource.

In some possible implementations, the transceiver unit 520 is further configured to send the third indication information to the terminal device, where the third indication information indicates information about a sub-area corresponding to sent satellite ephemeris information.

In some possible implementations, the satellite ephemeris information corresponding to the first sub-area includes one or more of the following: satellite ephemeris information of a satellite in the first sub-area at a current moment, first time information, satellite ephemeris information of a satellite that is to run to the first sub-area at first time, satellite ephemeris information of a satellite that is in a neighboring area of the first sub-area at the current moment, second time information, and satellite ephemeris information of a satellite that is to run to the neighboring area of the first sub-area at second time.

In some possible implementations, a geographical area range including the plurality of sub-areas corresponding to the first cell is the same as a coverage area of the first cell: or a geographical area range including the plurality of sub-areas corresponding to the first cell is greater than a coverage area of the first cell.

For some example beneficial effects of performing the communication method by the apparatus shown in FIG. 5, refer to related descriptions in the method embodiment shown in FIG. 2. Details are not described herein again. It may be understood that the units in this embodiment of this application may also be referred to as modules. The foregoing units or modules may exist independently, or may be integrated together.

Figure 6:
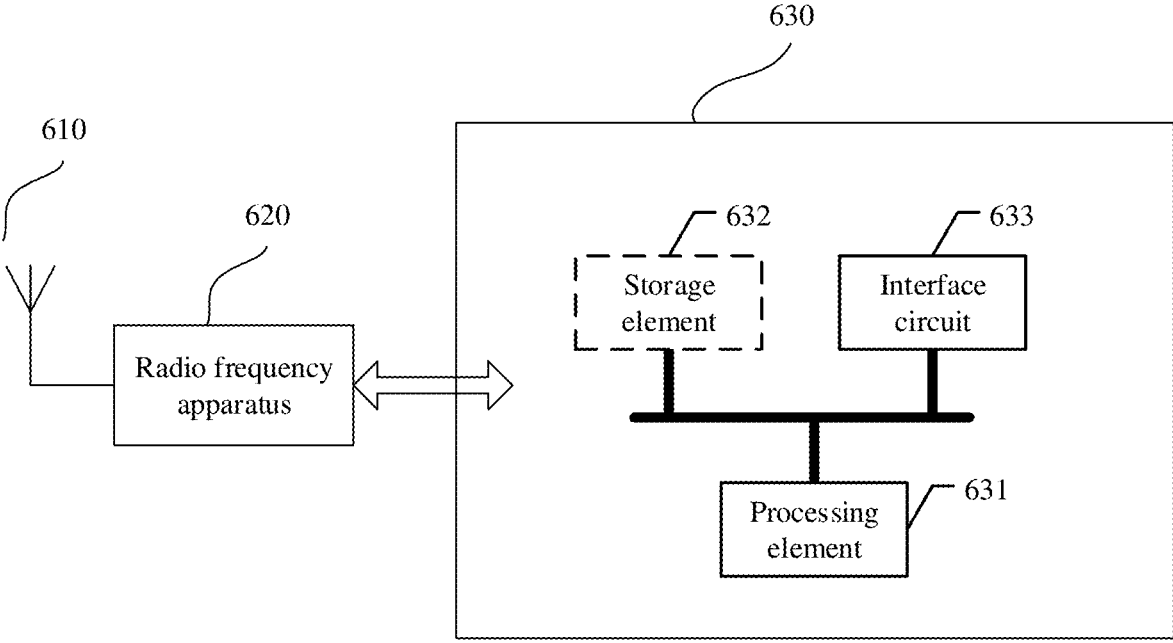
FIG. 6 is a schematic diagram of a terminal device according to an embodiment of this application.

FIG. 6 is a schematic diagram of a structure of a terminal device according to an embodiment of this application. The terminal device is configured to implement operations of the terminal device in the foregoing embodiments. As shown in FIG. 6, the terminal device includes an antenna 610, a radio frequency apparatus 620, and a signal processing part 630. The antenna 610 is connected to the radio frequency apparatus 620. In a downlink direction, the radio frequency apparatus 620 receives, through the antenna 610, information sent by a network device, and sends, to the signal processing part 630 for processing, the information sent by the network device. In an uplink direction, the signal processing part 630 processes information about the terminal device, and sends the information to the radio frequency apparatus 620. The radio frequency apparatus 620 processes the information about the terminal device, and then sends the processed information to the network device through the antenna 610.

The signal processing part 630 is configured to process each communication protocol layer of data. The signal processing part 630 may be a subsystem of the terminal device. The terminal device may further include another subsystem, for example, a central processing subsystem, configured to implement processing on an operating system and an application layer of the terminal device. For another example, a peripheral subsystem is configured to implement a connection to another device. The signal processing part 630 may be a separately disposed chip. Optionally, the foregoing apparatus may be located in the signal processing part 630.

The signal processing part 630 may include one or more processing elements 631, for example, include a main control CPU and other integrated circuits, and include an interface circuit 633. In addition, the signal processing part 630 may further include a storage element 632. The storage element 632 is configured to store data and a program. The program used to perform the method performed by the terminal device in the foregoing methods may be stored in the storage element 632, or may not be stored in the storage element 632, for example, stored in a memory outside the signal processing part 630, when used, the signal processing part 630 loads the program into the cache for use. The interface circuit 633 is configured to communicate with the apparatus. The foregoing apparatus may be located in the signal processing part 630. The signal processing part 630 may be implemented by using a chip. The chip includes at least one processing element and an interface circuit. The processing element is configured to perform steps of any method performed by the foregoing terminal device. The interface circuit is configured to communicate with another apparatus. In an implementation, units that implement the steps in the foregoing methods may be implemented in a form of a program invoked by a processing element. For example, the apparatus includes a processing element and a storage element. The processing element invokes a program stored in the storage element, to perform the method performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the method performed by the terminal device in the foregoing method embodiments.

In still another implementation, units of the terminal device that implement the steps in the foregoing methods may be configured as one or more processing elements. These processing elements are disposed in the signal processing part 630. The processing elements herein may be an integrated circuit, for example, one or more ASICs, one or more DSPs, one or more FPGAs, or a combination of these types of integrated circuits. The integrated circuits may be integrated together to form a chip.

The units that implement the steps in the foregoing methods may be integrated together and implemented in a form of a system-on-a-chip (SOC). The SOC chip is configured to implement the foregoing methods. At least one processing element and storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by invoking a program by the processing element, and functions of some units may be implemented by the integrated circuit.

It can be learned that the foregoing apparatus may include at least one processing element and interface circuit. The at least one processing element is configured to perform any method that is provided in the foregoing method embodiments and performed by the terminal device. The processing element may perform some or all steps performed by the terminal device in a first manner by invoking a program stored in the storage element: or may perform some or all steps performed by the terminal device in a second manner by combining instructions and a hardware integrated logic circuit in a processor element. Certainly, some or all steps performed by the terminal device may be alternatively performed by combining the first manner and the second manner.

Likewise, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be one memory, or may be a general term of a plurality of storage elements.

For some example beneficial effects of performing the communication method by the terminal device shown in FIG. 6, refer to related descriptions in the method embodiment shown in FIG. 2. Details are not described herein again. It may be understood that the units in this embodiment of this application may also be referred to as modules. The foregoing units or modules may exist independently, or may be integrated together.

Figure 7:
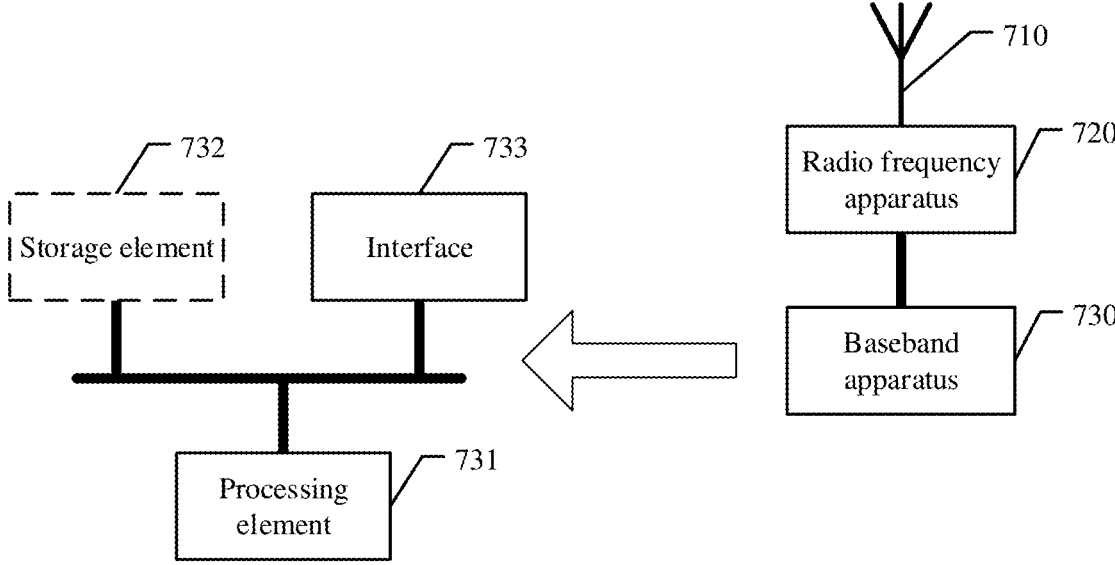
FIG. 7 is a schematic diagram of a network device according to an embodiment of this application.

FIG. 7 is a schematic diagram of a structure of a network device according to an embodiment of this application. The network device is configured to implement operations of the network device in the foregoing embodiments. As shown in FIG. 7, the network device includes an antenna 710, a radio frequency apparatus 720, and a baseband apparatus 730. The antenna 710 is connected to the radio frequency apparatus 720. In an uplink direction, the radio frequency apparatus 720 receives information sent by a terminal device through the antenna 710, and sends the information sent by the terminal device to the baseband apparatus 730 for processing. In a downlink direction, the baseband apparatus 730 processes information about the terminal device, and sends the information to the radio frequency apparatus 720. The radio frequency apparatus 720 processes the information about the terminal device, and then sends the processed information to the terminal device through the antenna 710.

The baseband apparatus 730 may include one or more processing elements 731, for example, include a main control CPU and another integrated circuit, and further include an interface 733. In addition, the baseband apparatus 730 may further include a storage element 732. The storage element 732 is configured to store a program and data. The interface 733 is configured to exchange information with the radio frequency apparatus 720. The interface is, for example, a common public radio interface (CPRI). The foregoing apparatus used in the network device may be located in the baseband apparatus 730. For example, the foregoing apparatus used in the network device may be a chip on the baseband apparatus 730. The chip includes at least one processing element and an interface circuit. The processing element is configured to perform the steps of any method performed by the network device. The interface circuit is configured to communicate with another apparatus. In an implementation, units in the network device that implement the steps in the foregoing methods may be implemented in a form of scheduling a program by a processing element. For example, an apparatus used in the network device includes a processing element and a storage element. The processing element invokes a program stored in the storage element, to perform the method performed by the network device in the foregoing method embodiments. The storage element may be a storage element that is located on a same chip as the processing element, namely, an on-chip storage element, or may be a storage element that is located on a different chip from the processing element, namely, an off-chip storage element.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. The integrated circuits may be integrated together to form a chip.

Units of the network device that implement the steps in the foregoing methods may be integrated together, and implemented in a form of a SoC. For example, the baseband apparatus includes the SoC chip, configured to implement the foregoing methods. At least one processing element and a storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the method performed by the network device provided in the foregoing method embodiments. The processing element may perform some or all steps performed by the network device in a first manner by invoking a program stored in the storage element: or may perform some or all steps performed by the network device in a second manner by combining instructions and a hardware integrated logic circuit in the processor element. Certainly, some or all steps performed by the network device may be alternatively performed by combining the first manner and the second manner.

Likewise, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be one memory, or may be a general term of a plurality of storage elements.

For some example beneficial effects of performing the communication method by the network device shown in FIG. 7, refer to related descriptions in the method embodiment shown in FIG. 2. Details are not described herein again. It may be understood that the units in this embodiment of this application may also be referred to as modules. The foregoing units or modules may exist independently, or may be integrated together.

An embodiment of this application further provides a communication system. The communication system includes a terminal device in any one of the foregoing method embodiments and the network device in this embodiment.

A person skilled in the art may understand that first, second, and various reference numerals in embodiments of this application are for distinguishing only for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one", "any one", or a similar expression means any combination of these items, including a single item (piece) or any combination of a plurality of items (pieces). For example, at least one (piece, or type) of a, b, or c may represent a, b, c, a and b, a and c, b and c, or a, b and c, where a, b, and c may be singular or plural. "A plurality of" means two or more than two, and another quantifier is similar to this.

All or some of the foregoing embodiments may be implemented by software, hardware, firmware, or any combination thereof. When software is used to implement embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal. Alternatively, the processor and the storage medium may also be arranged in different components of the terminal.

These computer program instructions may alternatively be loaded onto the computer or another programmable data processing device, so that a series of operation steps are performed on the computer or another programmable device to generate computer-implemented processing, and instructions executed on the computer or the another programmable device provide steps for implementing a function specified in one or more procedures in the flowchart and/or one or more blocks in the block diagram.

Although embodiments of this application are described with reference to specific features and the embodiments thereof, it is clear that various modifications and combinations may be made to embodiments of this application without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

Clearly, persons skilled in the art can make various modifications and variations to embodiments of this application without departing from the spirit and scope of embodiments of this application. In this way, embodiments of this application are intended to cover these modifications and variations of this application provided that they fall within the scope of the claims of this application and their equivalent technologies.

What is claimed is:

1. A communication method applied for a terminal device, comprising:

determining, based on area configuration information of a first cell of a network device and location information of a terminal device, a first sub-area corresponding to the terminal device, wherein the area configuration information indicates information about a plurality of sub-areas corresponding to the first cell, and the plurality of sub-areas comprise the first sub-area; and obtaining satellite ephemeris information corresponding to the first sub-area, wherein the obtaining satellite ephemeris information corresponding to the first sub-area comprises:

sending first indication information to the network device, to request to obtain the satellite ephemeris information corresponding to the first sub-area, wherein the first indication information comprises a first preamble corresponding to the first sub-area, and wherein the sending of the first indication information to the network device comprises sending the first preamble to the network device on a first access resource corresponding to the first sub-area; and receiving the satellite ephemeris information corresponding to the first sub-area from the network device, and the satellite ephemeris information corresponding to the first sub-area comprises one or more of the following:

first satellite ephemeris information of a first satellite in the first sub-area at a current moment, second satellite ephemeris information of a second satellite that is to run to the first sub-area at a first time, third satellite ephemeris information of a third satellite that is in a neighboring area of the first sub-area at the current moment, or fourth satellite ephemeris information of a fourth satellite that is to run to the neighboring area of the first sub-area at second time.

2. The communication method according to claim 1, wherein the first indication information further comprises bitmap information, wherein the bitmap information indicates the first sub-area.

3. The communication method according to claim 1, further comprising:

receiving second indication information from the network device, wherein the second indication information indicates information about a second sub-area corresponding to the satellite ephemeris information sent by the network device.

4. The communication method according to claim 1, wherein a geographical area range formed by the plurality of sub-areas corresponding to the first cell is greater than or equal to a coverage area of the first cell.

5. The communication method according to claim 1, further comprising:

receiving the area configuration information corresponding to the first cell from the network device.

6. The communication method according to claim 1, wherein the first indication information further comprises one or more of an identifier of the first sub-area, a central location coordinate of the first sub-area, or a user readable name of the first sub-area.

7. The communication method according to claim 1, wherein the first cell is divided into the plurality of sub-areas corresponding to the first cell, and an amount of satellite ephemeris information corresponding to each sub-area of the plurality of sub-areas is less than an amount of satellite ephemeris data corresponding to the first cell as a whole.

8. A communication apparatus, comprising:

at least one processor; and a non-transitory memory having instructions stored thereon that, when executed by the at least one processor, cause the apparatus to:

determine, based on area configuration information of a first cell of a network device and location information of a terminal device, a first sub-area corresponding to the terminal device, wherein the area configuration information indicates information about a plurality of sub-areas corresponding to the first cell, and the plurality of sub-areas comprise the first sub-area; and obtain satellite ephemeris information corresponding to the first sub-area, wherein to obtain the satellite ephemeris information corresponding to the first sub-area, the communication apparatus is caused to:

send first indication information to the network device, to request to obtain the satellite ephemeris information corresponding to the first sub-area, wherein the first indication information comprises a first preamble corresponding to the first sub-area, and wherein the sending of the first indication information to the network device comprises sending the first preamble to the network device on a first access resource corresponding to the first sub-area; and receive the satellite ephemeris information corresponding to the first sub-area from the network device, and the satellite ephemeris information corresponding to the first sub-area comprises one or more of the following:

first satellite ephemeris information of a first satellite in the first sub-area at a current moment, second satellite ephemeris information of a second satellite that is to run to the first sub-area at a first time, third satellite ephemeris information of a third satellite that is in a neighboring area of the first sub-area at the current moment, or fourth satellite ephemeris information of a fourth satellite that is to run to the neighboring area of the first sub-area at second time.

9. The communication apparatus according to claim 8, wherein the first indication information further comprises one or more of an identifier of the first sub-area, a central location coordinate of the first sub-area, or a user readable name of the first sub-area.

10. The communication apparatus according to claim 8, the first indication information further comprises bitmap information, wherein the bitmap information indicates the first sub-area.

11. The communication apparatus according to claim 8, wherein the communication apparatus is further caused to:
receive second indication information from the network device, wherein the second indication information indicates information about a second sub-area corresponding to the satellite ephemeris information sent by the network device.

12. The communication apparatus according to claim 8, wherein a geographical area range formed by the plurality of sub-areas corresponding to the first cell is greater than or equal to a coverage area of the first cell.

13. The communication apparatus according to claim 8, wherein the first cell is divided into the plurality of sub-areas corresponding to the first cell, and an amount of satellite ephemeris information corresponding to each sub-area of the plurality of sub-areas is less than an amount of satellite ephemeris data corresponding to the first cell as a whole.

14. The communication apparatus according to claim 8, wherein the communication apparatus is further caused to:
receive the area configuration information corresponding to the first cell from the network device.

15. A communication apparatus, comprising:
at least one processor; and
a non-transitory memory having instructions stored there on that, when executed by the at least one processor, cause the apparatus to:
determine a plurality of sub-areas corresponding to a first cell of a network device;
send area configuration information to a terminal device, wherein the area configuration information indicates information about the plurality of sub-areas corresponding to the first cell, the plurality of sub-areas comprise a first sub-area, the area configuration information is used by the terminal device to obtain satellite ephemeris information corresponding to the first sub-area, and the terminal device is located in the first sub-area;
receive first indication information from the terminal device, wherein the first indication information requests to obtain the satellite ephemeris information corresponding to the first sub-area, wherein the first indication information comprises a first preamble corresponding to the first sub-area, and wherein the receiving of the first indication information from the terminal device comprises receiving the first preamble from the terminal device on a first access resource corresponding to the first sub-area; and
send the satellite ephemeris information corresponding to the first sub-area to the terminal device,
wherein
the satellite ephemeris information corresponding to the first sub-area comprises one or more of the following:
first satellite ephemeris information of a first satellite in the first sub-area at a current moment, second satellite ephemeris information of a second satellite that is to run to the first sub-area at a first time, third satellite ephemeris information of a third satellite that is in a neighboring area of the first sub-area at the current moment, or fourth satellite ephemeris information of a fourth satellite that is to run to the neighboring area of the first sub-area at second time.

16. The communication apparatus according to claim 15, wherein
the first indication information further comprises bitmap information, wherein the bitmap information indicates the first sub-area.

17. The communication apparatus according to claim 15, wherein the communication apparatus is further caused to:
send second indication information to the terminal device, wherein the second indication information indicates information about a second sub-area corresponding to the sent satellite ephemeris information.

18. The communication apparatus according to claim 15, wherein a geographical area range formed by the plurality of sub-areas corresponding to the first cell is greater than or equal to a coverage area of the first cell.

19. The communication apparatus according to claim 15, wherein
the first indication information further comprises one or more of an identifier of the first sub-area, a central location coordinate of the first sub-area, or a user readable name of the first sub-area.

20. The communication apparatus according to claim 15, wherein the first cell is divided into the plurality of sub-areas corresponding to the first cell, and an amount of satellite ephemeris information corresponding to each sub-area of the plurality of sub-areas is less than an amount of satellite ephemeris data corresponding to the first cell as a whole.

* * * * *